Oct. 15, 1929.　　　J. SHAW　　　1,731,639

RING JOINT CUTTER

Filed March 29, 1928

INVENTOR
James Shaw
BY
ATTORNEY

Patented Oct. 15, 1929

1,731,639

UNITED STATES PATENT OFFICE

JAMES SHAW, OF LODI, CALIFORNIA

RING-JOINT CUTTER

Application filed March 29, 1928. Serial No. 265,631.

This invention relates to means for cutting the joints at the separated ends of piston rings, and particularly to a machine for cutting the special form of joint shown in my Patent No. 1,292,101, issued in January, 1919. One end of this joint is a groove which is circular in cross section and which is made by a milling cutter. This groove must also be curved circumferentially of the ring and concentric therewith so as to have the proper oil tight sliding fit with the adjacent end of the ring. Said adjacent end of the ring being normally in line with the end to be cut, is in the way of the cutting tool unless shifted to one side or the other.

The principal object of my invention, therefore, is to provide a device for clamping the ring in place adjacent the end to be cut and relative to the cutter so that the latter will make the groove in the ring in the proper place, and for then turning the ring so that this groove will also have the necessary circumferential curvature.

At the same time I have also provided means for enabling the unclamped end of the ring to be moved out of the way of the cutter.

A further object of the invention is to construct the device so that two rings may be cut simultaneously; and to arrange the structure so that by a few simple adjustments rings of different widths, etc., may be worked on.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
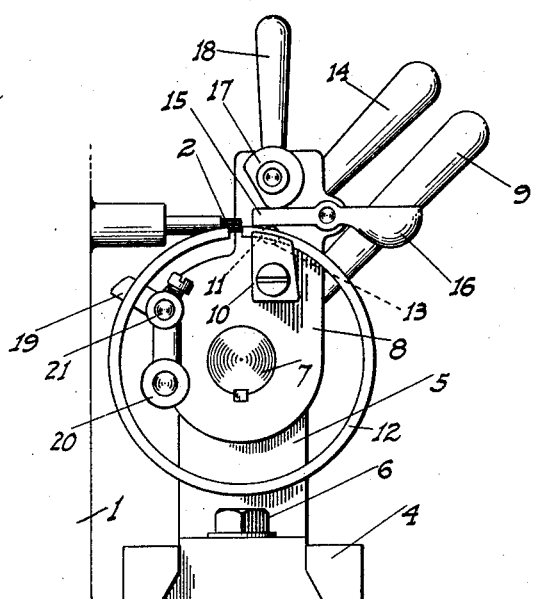
Fig. 1 is a front elevation of my ring-joint cutter.

Referring now more particularly to the characters of reference on the drawings, the numeral 1 denotes the frame of a milling machine of any suitable character having a rotary milling cutter 2 projecting therefrom. Projecting from the frame below the cutter is a bracket 3 on which are mounted guides 4 spaced longitudinally of the cutter and extending transversely thereof. These guides slidably support a stand 5 which is clamped in any position on the bracket by a bolt 6. Turnable in the stand is a shaft 7 extending transversely of the cutter, the axis of this shaft being located on a line at right angles to the cutter and radial to the outer end thereof. On one end of the shaft is fixed an upstanding block 8 disposed to one side of the cutter and projecting above the same. A radially extending handle 9 is applied to the other end of the shaft to enable the same and the block to be turned.

Removably but rigidly fixed on the block beyond the cutter is a short pad 10 having a circumferential recess 11 on its upper surface, the curvature of said recess being the same as that of a ring 12 to be cut, and having a width equal to that of two rings. This recess is cut in from the face of the pad adjacent the block, and is concentric with the shaft 7.

Screwed into the block from the face thereof opposite the pad and in vertical and longitudinal alinement with the upper end thereof is a clamping pin 13 provided with a handle 14. This pin is positioned to bear against the inner one of a pair of rings seated in the pad recess, and upon turning the handle 14 in one direction this pin firmly clamps against said ring so as to bind both rings in position in the pad. The position of the recess in the pad relative to the horizontal plane of the cutter is such that said cutter will engage and cut the rings at the desired point in their height, and so that said rings are tangential to the cutter.

Pivoted in the block 8 about the pad 10 and adapted at one end to bear down on the portions of the rings engaged by the pad is a bar 15, the other end of which is weighted as at 16, so that said opposite end tends to move upwardly and clear of the rings. The bar is held down against the rings when desired by a cam 17 mounted in the block above the bar and actuated by a suitable handle 18.

Figure 2:
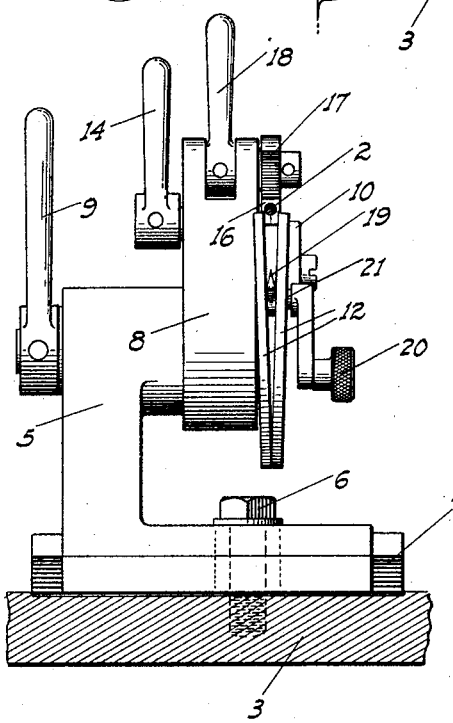
Fig. 2 is an end elevation of the same.
Figure 3:
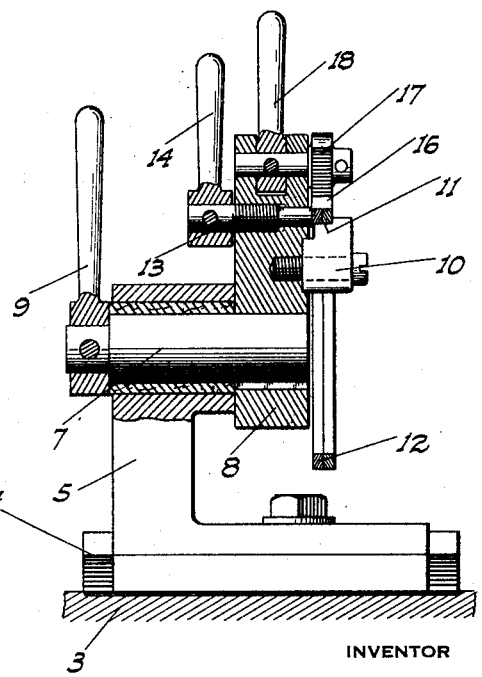
Fig. 3 is a cross section of the device.

The rings may thus be clamped in position so that they are concentric with the shaft 7 and tangential to the cutter, and positioned so that the ends to be cut are adjacent and facing the cutter; the pad being located so that only a short portion of the rings project therefrom toward the cutter. The opposite ends of the rings must then be obviously spread apart to avoid interference with the cutter. This is done by means of a wedge shaped arm 19 turnably mounted on the block and positioned so that its edge is transversely alined centrally between the rings, and ahead of the pad so as to engage the rings adjacent their free ends. The member 19 is normally disposed inwardly of the ring circle, and if the handle 20 connected with said arm is turned in a certain direction and for a certain distance, the arm will spread the free ends of the rings apart a sufficient distance to clear the cutter as shown in Fig. 2. The arm is transversely adjustable on its pivot spindle 21 so that if wider rings are supported in the pad the arm may be adjusted so that it may still be transversely disposed centrally between said rings.

In operation to remove a pair of rings and insert others, the cutter is first retracted, the arm turned from engagement with the rings, the pin 13 is retracted from clamping engagement with the rings and the cam 17 is turned so as to release the bar 15, allowing the latter to move upwardly and clear of the rings. The latter may then be removed from the pad without any interference with any of the parts of the structure and another pair of rings inserted in the proper relationship to the cutter. The bar 15 is then clamped down, the pin 13 advanced to a clamping position, the rings spread by arm 19 and the cutter advanced to engage the ends of the rings. The cutter is then rotated and with such rotation the rings are turned by turning the handle 9 so that the cut as made will extend circumferentially about the rings and concentric therewith.

The entire structure being shiftable transversely on its supporting bracket enables the cutter to be transversely alined centrally between a pair of rings, so as to cut equally into both, regardless of the width of the rings being worked on. For different widths and diameters of rings, different pads 10 are of course used, since any one pad is only adapted to receive rings of a certain width and diameter.

By means of this device a great number of rings may be accurately cut by an unskilled workman or apprentice on a day's time without the danger of the cuts being out of line, or the rings being warped and permanently distorted by an excessive lateral spreading of the same to avoid the cutter.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with a rotary cutting tool, a means mounted adjacent the tool for clamping a piston ring tangential to the tool and with one end of the latter engaging an end of the ring, and means applied to said clamping means for rotating the ring about its axis.

2. In combination with a rotary cutting tool, a turnable shaft extending transversely of the tool with its axis disposed on a line projected at right angles from the outer end of the tool, a block fixed on the shaft, means mounted on the block for clamping a piston ring so that it is held concentric with the shaft with one end bearing against the tool, and means for rotating the shaft and block.

3. In combination with a rotary cutting tool, a means mounted adjacent the tool for clamping a pair of piston rings together adjacent one end in a position tangential to the tool and with the axis of the tool disposed centrally between the rings, said end of the rings bearing against the tool; and means mounted in connection with the clamping means for spreading the rings apart adjacent their free ends to avoid interference with the tool.

4. In combination with a rotary cutting tool, a means mounted adjacent the tool for clamping a pair of piston rings together adjacent one end in a position tangential to the tool and with the axis of the tool disposed centrally between the rings, said end of the rings bearing against the tool; and a wedge shaped member for insertion between the rings adjacent their free ends to separate them a predetermined distance at such ends.

5. In combination with a rotary cutting tool, a turnable shaft extending transversely of the tool with its axis disposed on a line projected at right angles from the outer end of the tool, a block fixed on the shaft, a pad mounted on the block having a recess in one face, said recess being curved concentric with the shaft and adapted to support a ring of the same internal curvature, means on the block for clamping the ring against the bottom of the recess, means on the block for clamping the ring against the side of the recess, and means for rotating the shaft.

In testimony whereof I affix my signature.

JAMES SHAW.